United States Patent
Lehmacher et al.

(10) Patent No.: US 6,343,123 B1
(45) Date of Patent: *Jan. 29, 2002

(54) METHOD OF ESTABLISHING A TOLL-FREE COMMUNICATION CONNECTION, AS WELL AS A SERVICE UNIT, AN EXCHANGE AND A COMMUNICATIONS NETWORK

(75) Inventors: Markus Lehmacher, Stuttgart; Stephan Rupp, Besigheim, both of (DE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/099,896

(22) Filed: Jun. 18, 1998

(30) Foreign Application Priority Data

Jun. 20, 1997 (DE) .......................................... 197 26 175

(51) Int. Cl.⁷ ............................................... H04M 7/00
(52) U.S. Cl. .................................. 379/220.01; 379/229
(58) Field of Search ................................ 379/219, 220, 379/221, 222, 224, 225, 226, 229

(56) References Cited

U.S. PATENT DOCUMENTS

| | | | | |
|---|---|---|---|---|
| 4,757,267 A | * | 7/1988 | Riskin ........................ | 379/113 |
| 5,136,636 A | * | 8/1992 | Wegrzynowicz ............ | 379/207 |
| 5,333,185 A | * | 7/1994 | Burke et al. ................ | 379/127 |
| 5,406,620 A | * | 4/1995 | Pei ............................. | 379/220 |
| 5,506,897 A | | 4/1996 | Moore et al. ............... | 379/127 |
| 5,533,107 A | | 7/1996 | Irwin et al. ................. | 379/201 |
| 5,550,909 A | * | 8/1996 | Chanda et al. ............. | 379/220 |
| 5,617,448 A | | 4/1997 | Bolinger, Jr. et al. ...... | 379/114 |
| 5,913,160 A | * | 6/1999 | Leung ......................... | 455/403 |
| 5,974,133 A | * | 10/1999 | Fleischer, III et al. ...... | 379/230 |

OTHER PUBLICATIONS

Marchisio L. et al: "TMN Management of Pan–European In–Based Freephone" IEEE Network & Management Symposium, US, NY IEEE, Bd SYMP 5, pp. 4.2.1–4.2.10.

"IN–basierte Losungen fur schnurlose Endgerate" by Cappiello et al In: Alcatel Telecom Rundschau, 1, Quartal 1996, pp. 37–47.

"Characteristics of Intelligent Networks" by L. Alvarez Mazo et al, Electrical Telecommunications, vol. 64, No. 4, 1989, pp. 314 to 319.

ITU–T's Recommendation E.152 "International Freephone Service" of Jul. 1996.

ITS–T's Recommendation E.169 "Numbering Plan for Universal International Freephone Service", Feb. 1996.

* cited by examiner

Primary Examiner—Harry S. Hong
Assistant Examiner—Hector Agdeppa
(74) Attorney, Agent, or Firm—Ware, Fressola, Van Der Sluys & Adolphson LLP

(57) ABSTRACT

To establish a toll-free communication connection between a calling terminal (TE21) which is connected to a first communications network (KN1), and a called terminal, a connection request with a toll-free universal call number (IFN) is transmitted as a called number to the first communications network (KN1). In this case the toll-free universal call number (IFN) is provided by a service unit (SERV) of a second communications network (KN2). The first communications network (KN1) recognizes the connection request as one with a toll-free universal call number and an inquiry is then sent by the first communications network (KN1) to this service unit (SERV) of the second communications network (KN2). From the toll-free universal call number this service unit (SERV) then determines a toll-free local call number (LFN) of the first communications network (KN1), and returns same to the first communications network (KN1). The first communications network (KN1) subsequently establishes the requested connection in accordance with this determined toll-free local call number (LFN).

18 Claims, 3 Drawing Sheets

METHOD OF ESTABLISHING A TOLL-FREE COMMUNICATION CONNECTION, AS WELL AS A SERVICE UNIT, AN EXCHANGE AND A COMMUNICATIONS NETWORK

TECHNICAL FIELD

The invention concerns a method of establishing a toll-free communication connection between a calling terminal and a called terminal, as well as a service unit and an exchange for establishing a toll-free communication connection.

BACKGROUND OF THE INVENTION

Many telephone networks provide a service feature which enables the called subscriber to accept the cost of a call. In the U.S. this service feature is known as the 800 service, and in the German Telecom it is the 130 service. A description of this service feature can be found in the article "Characteristics of intelligent networks" by L. Alvarez Mazo et al., Electrical Telecommunications, volume 63, no. 4, 1989, pages 314 to 319.

If a subscriber dials a toll-free call number, which for example begins with the digital sequence 130 in Germany and with the digital sequence 800 in the U.S, the connection request is routed to a control unit of the respective communications network. This control unit converts the called number into a "normal" call number which represents the called subscriber's actual call number. It further routes the charging of the fees in such a way, that the applicable fees for the connection are charged to the called subscriber. In that case the control unit has an IN (Intelligent Network) architecture.

This solution has the disadvantage that a toll-free call number is only available locally in a single communications network. It is therefore not possible to dial a toll-free universal call number which is valid in several national telephone networks and can thus be used for example in the U.S. and in Germany as well.

ITU-T's recommendation E.152 "International Freephone Service" of July 1996 describes further possibilities about how the above service feature can also be provided for a connection between subscribers of different national telephone networks. One possibility is to locate the control unit in the network of the calling subscriber, and to convert a toll-free local call number of this network into the international call number of the called subscriber. Another possibility is that a network enables dialing a toll-free local call number from outside of this network. However, both of these possibilities also have the disadvantage already mentioned above.

The invention now starts with another possibility described by this recommendation. This possibility is also described in greater detail in ITU-T's recommendation E.169 "Numbering Plan for Universal International Freephone Service", February 1996. It provides a universal international toll-free phone number in the international numbering area. Such a call number includes a service code for a global service (digital sequence 00-800) and a universal subscriber number.

This solution makes it possible to dial a toll-free universal call number, which can be used in all national telephone networks. However there is the disadvantage that the issuance and the management of such call numbers must take place centrally all over the world, and the supply of available call numbers is limited, which is also why extensive preconditions exist for obtaining such a number.

SUMMARY OF THE INVENTION

The object of the invention is to enable the use of toll-free universal call numbers, which do not need to be centrally issued and managed all over the world.

This object is achieved with a method of establishing a toll-free communication connection between a calling terminal, which is connected to a first communications network, and a calling terminal, where with this method of establishing a connection the calling terminal sends a connection request with a toll-free universal call number as the called number to the first communications network, wherein the toll-free universal call number is provided by a service unit of a second communications network, that the connection request is recognized as a connection request with a toll-free universal call number, and an inquiry is sent by the first communications network to this service unit of the second communications network, that the service unit determines a toll-free local call number of the first communications network from the toll-free universal call number, and informs the first communications network of this, and that the first communications network establishes the requested connection in accordance with this determined toll-free local call number.

This object is also achieved by a service unit for establishing a toll-free communication connection between a calling terminal which is connected to a first communications network, and a calling terminal, wherein the service unit is located in a second communications network, that the service unit is equipped with a reception unit for receiving an inquiry from the first communications network which includes a toll-free universal call number, that the service unit is equipped with a control unit for determining a toll-free local call number of the first communications network from the toll-free universal call number, and that the service unit is equipped with a transmission unit for returning the determined toll-free local call number to the first communications network.

This object is still further achieved by an exchange of a first communications network with means to receive a connection request with a toll-free universal call number as the called number, wherein the exchange is equipped with means which are designed to recognize the connection request as one with a toll-free universal call number, and to send an inquiry to the service unit of a second communications network which provides this toll-free universal call number, and that the exchange is equipped with means for receiving a toll-free local call number returned by the service unit, and that the exchange is equipped with means for controlling the establishment of the requested connection via the first communications network in accordance with this toll-free local call number.

This object is also achieved by a first communications network with means for receiving a connection request with a toll-free universal call number as the called number, wherein the communications network is equipped with means designed to recognize the connection request as one with a toll-free universal call number, and send an inquiry to a service unit of a second communications network which provides this toll-free universal call number, that the communications network is equipped with means for receiving a toll-free local call number returned by the service unit, and that the communications network is equipped with means for controlling the establishment of the requested connection via the first communications network in accordance with this toll-free local call number.

The invention is based on the idea of providing a "virtual" toll-free universal call number, which is issued and managed by a local provider, for example a national network operator or a service provider, and to map this toll-free universal call number by means of a service point of this network operator or service provider, respectively to a locally valid toll-free call number of that communications network to which the calling subscriber is presently connected. The result is a twofold conversion of such a toll-free universal call number: first the toll-free universal call number is converted into a respective toll-free local call number, and then into the target call number.

In the sense of the invention a toll-free connection and a toll-free call number must be understood in that the called subscriber takes over all or at least part of the fees charged for such a connection.

One advantage of the invention is that each network operator or service provider of a communications network is able to offer toll-free universal call numbers as an additional service. This increases the available call numbers, the management and the issuance of such numbers is decentralized and therefore becomes more flexible.

The invention can be integrated at low cost into existing mobile radio networks, if the subscriber profile recognizes the dialing of a "virtual" toll-free call number. The invention can of course also be integrated into all other communications networks, particularly telephone networks.

Other advantages are obtained particularly if an identification of the calling subscriber or terminal is also taken into account in the conversion of the universal into the toll-free local call number. In this way a toll-free universal call number can be used multiple times for different groups of subscribers.

BRIEF DESCRIPTION OF THE DRAWINGS

The following explains the invention as an example by means of two embodiments with the aid of the attached drawings, wherein.

BEST MODE FOR CARRYING OUT THE INVENTION

The first embodiment describes the performance of the method of the invention and the establishment of a service unit according to the invention, an exchange according to the invention and a communications network according to the invention, for the instance where the calling subscriber is a mobile subscriber.

Figure 1:
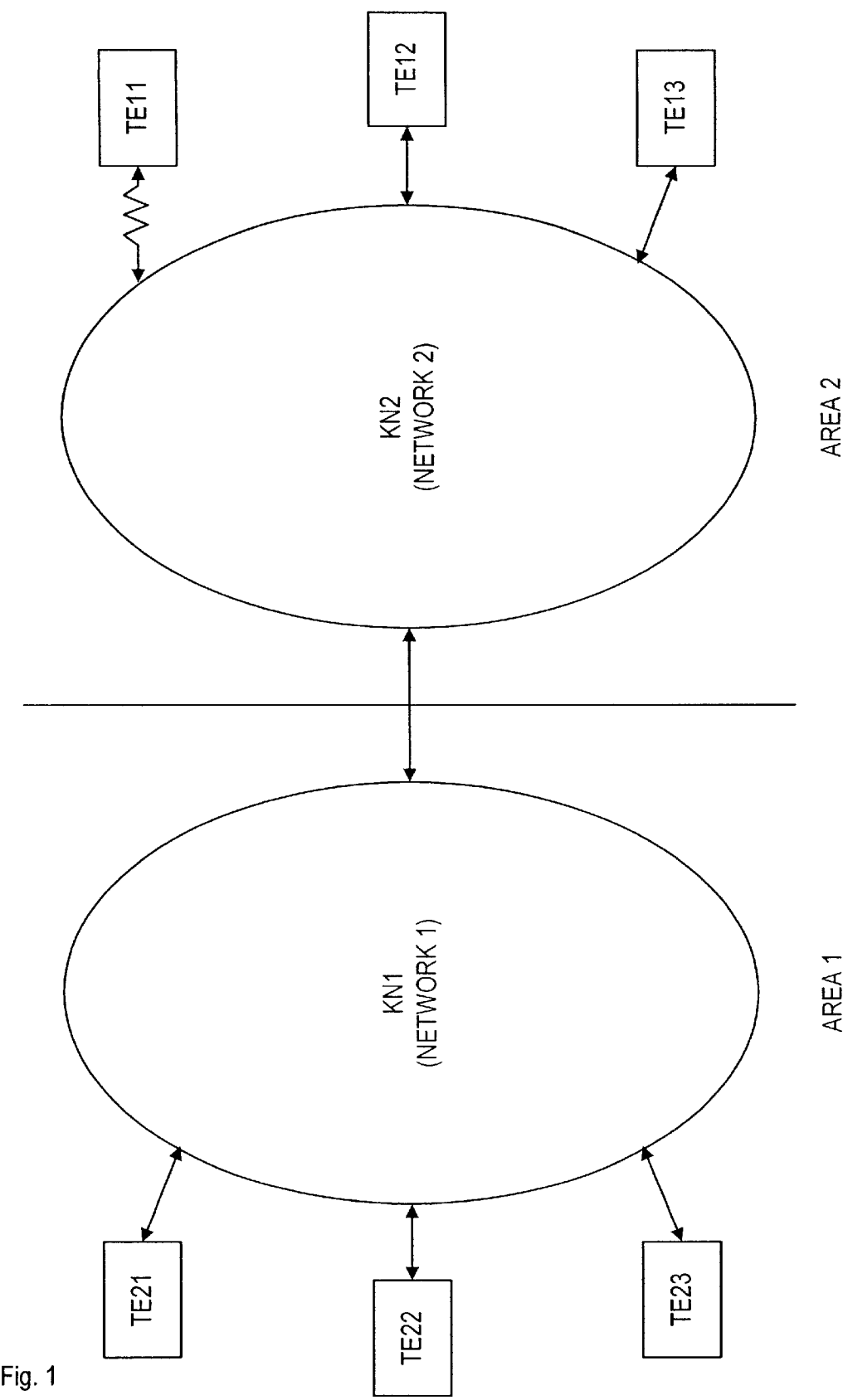
FIG. 1 illustrates a block diagram of a communication system with two communications networks.

FIG. 1 illustrates two interconnected communications networks KN1 and KN2, and several terminals TE11 to TE13 or TE21 to TE23 which are assigned to the latter.

The communications networks KN1 and KN2 respectively represent a national telephone network which has its own numbering area REAL1 or AREA2. The subscribers of the respective communications network are addressed in accordance with this numbering area. To establish a connection between a subscriber of the communications network KN1 and a subscriber of the communications network KN2, a qualifying code must be dialed, then the country code of the communications network KN2, and then the call number of the called subscriber according to the numbering area AREA2 of the communications network KN2.

Each of the communications networks KN1 and KN2 comprises several interconnected subscriber exchanges, transit exchanges and mobile radio exchanges. The terminals TE11 to TE23 of the subscribers of communications networks KN1 and KN2 are connected to the communications networks KN1 and KN2 via subscriber exchanges, or via mobile radio exchanges if they are mobile radio terminals. The terminal TE21 is such a mobile radio terminal.

Each of the communications networks KN1 and KN2 is divided into different subnetworks which are assigned to different network operators.

The communications networks KN1 and KN2 can therefore comprise trunk networks, subscriber station networks and mobile radio networks of different network operators. In the same way the services offered by the communications networks KN1 and KN2 can be provided by separate service providers.

It is of course also possible for all of the telecommunication services of the communications networks KN1 and KN2 to be respectively provided by a single network operator.

Figure 2:
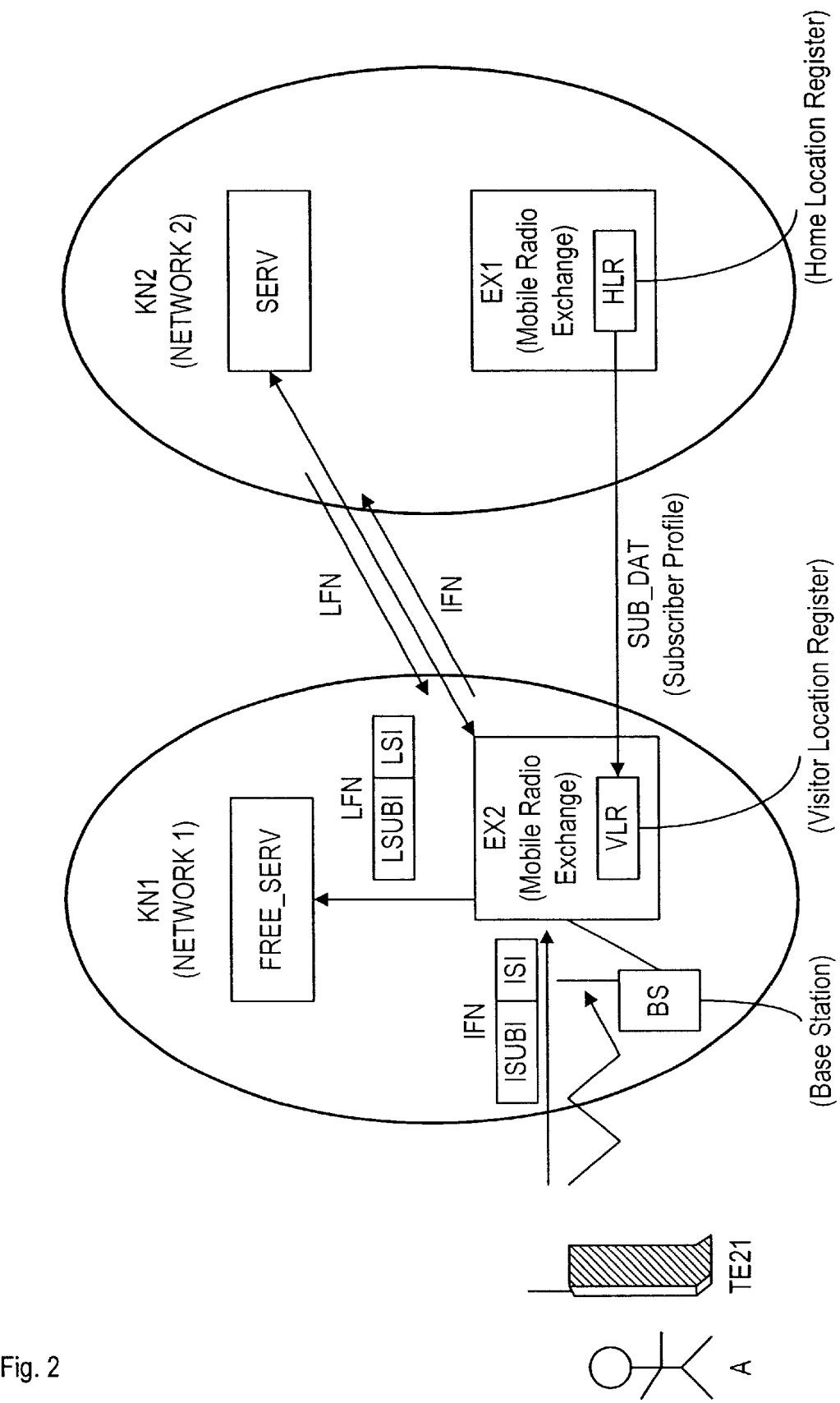
FIG. 2 illustrates a detailed block diagram of the communications networks in FIG. 1.

The detailed structure of the communications networks KN1 and KN2 will now be explained by means of FIG. 2. FIG. 2 illustrates the communications networks KN1 and KN2 and the terminal TE21 which is assigned to a subscriber A. The terminal TE21 is connected to the communications network KN1 via a radio interface, and the communications networks KN1 and KN2 exchange data with each other.

The exchanges of the communications network KN1 have a mobile radio exchange EX2 with a base station BS for example, which provides the radio interface to the terminal TE21. In addition, the communications network KN1 has a service unit FREE_SERV. The exchanges of the communications network KN2 have a mobile radio exchange EX1 for example. The communications network KN2 additionally has a service unit SERV.

The service unit FREE_SERV in the communications network KN1 provides a service which allows toll-free connections to be established (freephone service, freephone system). Call numbers of the numbering area AREA1 of the communications network KN1, which begin with a predetermined digital sequence and a service code LSI, are routed by the communications network KN1 to the service unit FREE_SERV. The service code LSI for example has the digital sequence 0800. The service unit FREE_SERV determines the target subscriber by means of the succeeding digital sequence and a subscriber code LSUBI, and routes the charges for this connection so that they are fully or partly accepted by the called subscriber. Call numbers of the numbering area AREA1 of the communications network KN1, which begin with the service code LSI and are processed by the service unit FREE_SERV in accordance with the above described method, represent a toll-free local call number LFN of the communications network KN1.

The service unit FREE_SERV has a service control point in accordance with the IN (Intelligent Network) architecture. The precise construction, function and incorporation of the service unit FREE_SERV into the communications network KN1 can be found for example in the article "Characteristics of intelligent networks" by L. Alvarez Mazo et al., Electrical Telecommunications, volume 63, no. 4, 1989, pages 314 to 319.

However it is also possible for the service unit FREE_SERV to be integrated into the control of an exchange, for example a transit exchange, which in this way provides the above function as a service feature.

In the same way as the service unit FREE_SERV, the service unit SERV has a service control point in accordance with the IN architecture. This service control point converts a call number transmitted to it, which represents a toll-free universal call number IFN provided by the service control point, into a toll-free local call number LFN of the communications network KN1.

The terminal TE21 is a conventional mobile radio terminal according to the GSM, IS54, IS95 or SMPS-D standard for example. It is assigned to subscriber A and is therefore addressed in the communications networks KN1 and KN2 with the subscriber code of A.

The mobile radio exchanges EX1 and EX2 are constructed like conventional mobile radio exchanges, for example in accordance with one of the above-cited standards. Therefore they are respectively connected to a home location register, to a visitor location register, and to several base stations.

The base stations, for example base station BS, provide the radio interfaces in the respective radio coverage areas assigned to the mobile radio exchange.

Each mobile radio subscriber is assigned to a mobile radio exchange which represents his mobile radio home exchange. Its home location register stores all the subscriber data and also the path guidance data, which indicate where the subscriber is presently located. The visitor location register stores the subscriber data and also the path guidance data of those subscribers who are located in the coverage areas assigned to the mobile radio exchange, for whom the latter is not the mobile radio home exchange.

Of the visitor and home location registers of the mobile radio exchanges EX1 and EX2, the home location register HLR of the mobile radio exchange EX1 and the visitor location register VLR of the mobile radio exchange EX2 are shown as examples.

The mobile radio exchange EX1 is the mobile radio home exchange of subscriber A, and the mobile radio exchange EX2 is the mobile radio exchange where the subscriber A and his terminal TE21 are presently located in one of its radio coverage areas. In this way all the data of subscriber A are stored in the home location register HLR. If subscriber A moves within the coverage area of mobile radio exchange EX2, and his mobile radio terminal TE21 connects for the first time with the mobile radio exchange EX2, the latter knows that it does not represent the mobile radio home exchange of subscriber A, and that the mobile radio exchange EX1 takes over this role. It then establishes a connection to the mobile radio exchange EX1 via which a part of the data of subscriber A are loaded from the home location register HLR to the visitor location register VLR of the mobile radio exchange EX2. The transmitted subscriber data also contain the subscriber profile SUB_DAT of subscriber A. Among other things the subscriber profile stores the call numbers dialed by subscriber A which comprise predetermined services.

Toll-free universal call numbers IFN have a service code ISI and a subscriber code ISUBI. The toll-free universal call numbers which apply to the subscriber A are stored in the subscriber A's profile SUB_DAT in the home location register HLR and are linked to the IN service provided by the service unit SERV. This linkage is advantageously obtained in that not all such call numbers are stored in the subscriber profile SUB_DAT, and are linked to the service of the unit SERV, but only the first digital sequence which identifies said call numbers and the service code ISI. In this case the service code ISI is the digital sequence 0130 for example.

It is also possible for an inquiry to be sent to the service unit SERV, independently of the call number dialed by the subscriber A. The linkage of a toll-free universal call number with the service of the unit SERV, and thereby the recognition of the toll-free universal call number, then takes place in the service unit SERV itself. In that case the subscriber profile SUB_DAT only stores a service code and possibly the address of the service unit SERV.

The following is the sequence for establishing a connection from subscriber A to a subscriber with a toll-free universal call number: if subscriber A moves with his terminal TE21 into the area of another communications network, in this case communications network KN1, the subscriber profile SUB_DAT, and thus the above-cited linkage, are loaded by the home location register HLR into the visitor location register of an exchange in this communications network, in this case the visitor location register VLR.

If the subscriber A dials a toll-free universal number IFN, his terminal TE21 sends a connection with the number IFN as the called number via the base station BS to the mobile radio exchange EX2. The control of the exchange EX2 checks the subscriber profile SUB_DAT assigned to the subscriber A, which is stored in the visitor location register VLR. This lets the control recognize that the digital sequence at the start of the call number is the service code ISI, which is linked to the service IN provided by the service unit SERV.

The inquiry to the service unit SERV is transmitted via the no. 7 signalling system. In this case the service unit SERV and the exchange EX1 communicate with each other by means of the INAP (Intelligent Network Application) protocol. But another transmission network can also be used for this communication, for example an ATM (Asynchronous Transfer Mode), or a LAN (Local Area Network).

The service unit SERV determines a toll-free local call number LFN for the toll-free universal call number IFN, and returns this call number as a response to the exchange EX1. Under the control of the service unit SERV, the exchange EX1 then replaces the toll-free universal call number IFN contained in the connection request, with the toll-free local call number LFN determined by the service unit SERV, and then routes the connection request further in accordance with this new called number.

In accordance with the service code LSI, the connection request is then routed via the communications network KN1 to the service unit FREE_SERV, which performs a further conversion of the call number and applies the fees charged for the connection based on this connection request.

Figure 3:
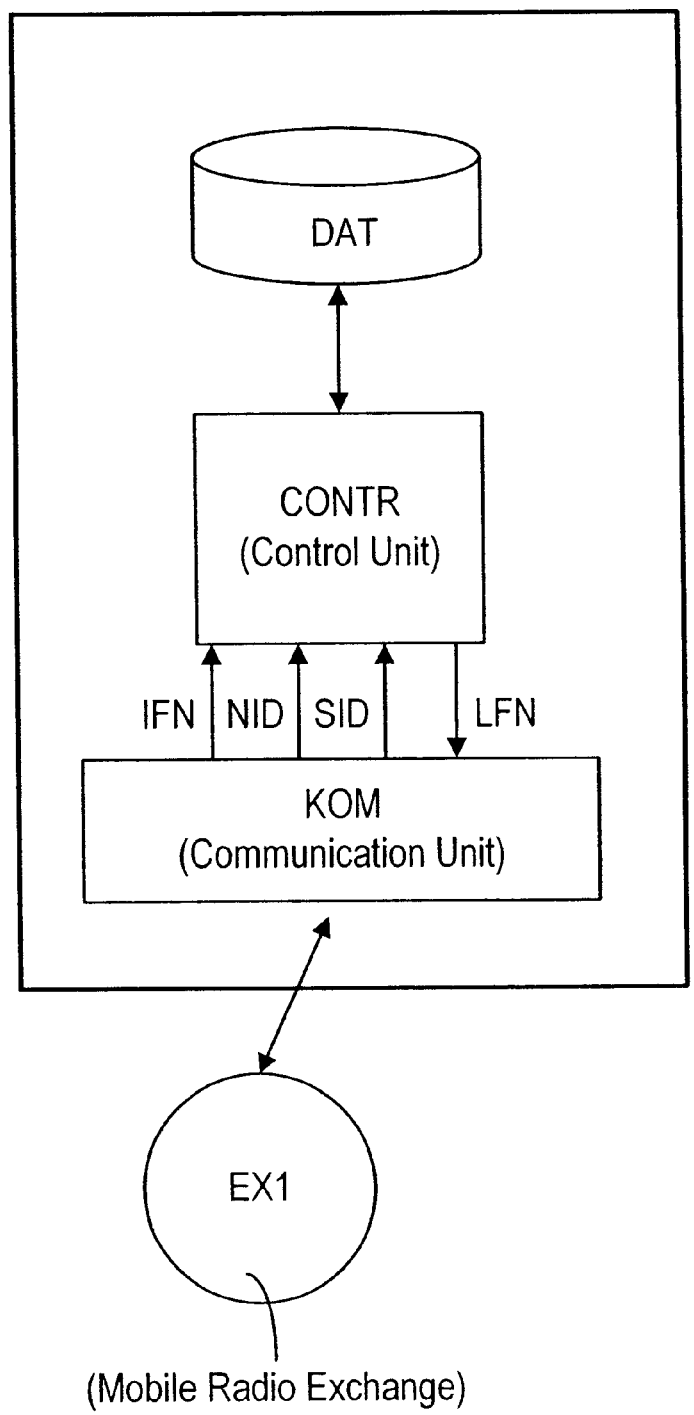
FIG. 3 illustrates a block diagram of a service unit according to the invention.

By means of FIG. 3 the following describes in greater detail the function of the service unit SERV. FIG. 3 illustrates the service unit SERV and the exchange EX1 which communicate with each other. The service unit SERV comprises a data base DAT, a control unit CONTR and a communication unit KOM.

The communication unit KOM performs the communication with the exchange EX1 and thereby exchanges data and control commands with the exchange EX1. After an inquiry by an exchange, it routes the toll-free universal call number IFN contained in the connection request to the control unit CONTR, plus a network code NID and a subscriber code SID which describes the calling subscriber, in this case subscriber A. The network code NID identifies that communications network, in this case communications network KN1, from which the inquiry was transmitted. In a countermove it steers the input of the toll-free local call number LFN, which was transmitted to it by the control unit CONTR, to the waiting connection request via the inquiring exchange.

By accessing the data base DAT, the control unit CONTR determines the toll-free local call number LFN from the toll-free universal call number IFN as a function of the network code NID and the subscriber code SID.

The data base DAT stores linkages between a number of toll-free universal call numbers IFN and the toll-free local call number LFN. It further stores whether a toll-free universal call number is valid or not, i.e. whether a call number beginning with the service code ISI was issued to a subscriber as a toll-free universal call number. In this case each valid toll-free universal call number is assigned at least one toll-free local call number.

It is advantageous if the data base DAT is structured as follows: as a function of the subscriber code ISUBI of a toll-free universal call number, it is indicated whether it is a valid, or a not yet issued toll-free universal call number. If the call number is valid, reference is made to a toll-free local call number LFN from a set of toll-free universal call numbers IFN assigned to this toll-free local call number LFN, as a function of the network code NID and the subscriber code SID.

The following steps must be carried out to have the service unit SERV provide a toll-free universal call number IFN:

A linkage of the call number IFN to the service offered by the service unit SERV is input into the subscriber profiles of those subscribers to whom the use of the call number IFN is to be provided.

Those communications networks in which the call number IFN must be made available, must be provided with toll-free local call numbers LFN and the pertinent services which control the charging of fees and the conversion to a subscriber call number in the respective communications network. These toll-free local call numbers LFN are further input to the call number IFN in the data base DAT as a function of the respective network code NID.

One or several communications networks can also be provided with two or more toll-free local call numbers LFN for the call numbers IFN. They would then be input to the call number IFN in the data base DAT as a function of the subscriber code SID. As a function of a subscriber or groups of subscribers, this would provide different toll-free local services under the same toll-free universal call number IFN.

Of course, the use of the subscriber code SID for determining the call number LFN could also be omitted. It is furthermore possible to control the assignment of a toll-free local call number LFN as a function of other or further parameters.

It is also possible for the exchange EX1 to identify the called number of a connection request by other means than by using the subscriber profile SUB_DAT as a toll-free universal call number IFN. A list of toll-free universal call numbers IFN or their service codes ISI can be made available for example in mobile radio exchanges of the communications network KN1. This list would then be used to verify the called number of every incoming connection request. If a called number is recognized as a toll-free universal call number, it is followed by an inquiry to the service unit assigned to this toll-free universal call number, as indicated earlier. In this case the process can also be carried out by switching on an IN service of the communications network KN1 i.e. the recognition of a toll-free universal call number would no longer be performed by the exchange EX2, or only partially.

It is furthermore possible that the communications networks KN1 and KN2 do not represent two different national telephone networks, but represent general communications networks of the different network operators. For example, the communications networks KN1 and KN2 can be networks of two different mobile radio network operators.

The second embodiment describes how the method of the invention is carried out, and the construction of a service unit according to the invention, an exchange according to the invention and a communications network according to the invention, for the instance where the calling subscriber is a fixed network subscriber.

The communications environment is constructed in accordance with FIGS. 1, 2, and 3, with the difference that the exchanges EX1 and EX2 are normal subscriber exchanges, the terminal TE21 is replaced by the terminal TE12 and is assigned to a subscriber of the communications network KN1

As described earlier, the exchange EX1 recognizes a toll-free universal call number IFN by using a list of toll-free universal call numbers IFN or their service codes SID. In this case as well, the recognition can take place by switching on an IN service. Otherwise the method of establishing a connection continues as described earlier.

Another possibility of recognizing a connection request with a toll-free universal call number becomes available when the telephone networks perform a subscriber-referenced path guidance, such as proposed for example by the UPT (Universal Personal Telecommunication) concept. Such a path guidance has subscriber profiles which are loaded into the visitor network when the subscriber logs on to a fixed network, or also to a mobile radio terminal of the visitor network. These subscriber profiles can be used to advantage analogously to the method for recognizing a toll-free universal call number described earlier.

The same also applies if the communications network KN1 does not have a subscriber-referenced, but rather a terminal-referenced profile. By entering a linkage between special call numbers received by the pertinent terminal and a service, a toll-free universal call number can be recognized analogously to the above description for FIGS. 2 and 3.

Of course the above described embodiments of the invention can also be transmitted to the communications networks which are used for exchanging mixed voice, data and/or video, and for transmitting these data. Since such networks often have terminal-referenced or subscriber-referenced profiles available, the use of these profiles for recognizing toll-free universal call numbers is particularly advantageous in this case as well. In this connection the call number not only represents a certain digital sequence for addressing a called subscriber, but very generally a combination of numbers and/or letters for addressing these subscribers.

What is claimed is:

1. A method of establishing a toll-free communication connection between a calling terminal (TE21), which is connected to a first communications network (KN1), and a called terminal, where with this method of establishing a connection the calling terminal (TE21) sends a connection request with a toll-free universal call number (IFN) as the called number to the first communications network (KN1), wherein the toll-free universal call number is not recognized by the first communications network as a local toll-free number, characterized in that the toll-free universal call number (IFN) is provided by a service unit (SERV) of a second communications network (KN2), that the connection request is recognized as a connection request with a toll-free universal call number by the first communication network so that an inquiry is sent by the first communications network (KN1) to this service unit (SERV) of the second communications network (KN2), that the service unit (SERV) determines a toll-free local call number (LFN) of the first communications network (KN1) from the toll-free universal call number (IFN) and informs the first communications network (KN1) of this toll-free local call number (LFN), and that the first communications network (KN1) establishes the requested connection in accordance with this determined toll-free local call number (LFN).

2. A method as claimed in claim 1, characterized in that the determined toll-free local call number (LFN) is input into the connection request as the called number, and the connection request is routed in accordance with this call number to a control unit (FREE_SERV) of the first communications network (KN1), which is responsible for controlling toll-free connections.

3. A method as claimed in claim 2, characterized in that an identification (NID) of the inquiring communications network is sent to the service unit (SERV), and that the service unit (SERV) determines the toll-free local call number (LFN) from the toll-free universal call number (IFN) as a function of the identification (NID) of the inquiring communications network.

4. A method as claimed in claim 3, characterized in that an identification (SID) of the calling terminal, or of the subscriber (A) assigned to the calling terminal, is sent by the first communications network (KN1) with the inquiry to the service unit (SERV), and that the service unit (SERV) determines the toll-free local call number (LFN) from the toll-free universal call number (IFN) as a function of the identification (SID) of the calling terminal, or the subscriber (A) assigned to the calling terminal.

5. A method as claimed in claim 4, characterized in that the toll-free universal call number (IFN) is recognized in the first communications network (KN1) by means of a profile (SUB_DAT) assigned to the calling terminal or its subscriber (A).

6. A method as claimed in claim 5, characterized in that the profile (SUB_DAT) is loaded from the second communications network (KN2) to the first communications network (KN1).

7. A method as claimed in claim 6, characterized in that the profile (SUB_DAT) is loaded when the calling terminal (TE21) contacts the first communications network (KN1) for the announcement.

8. A method as claimed in claim 7, characterized in that a linkage of the toll-free universal call number (IFN) with a service provided by the service unit (FREE_SERV) is input into the profile (SUB_DAT).

9. A method as claimed in claim 8, characterized in that the calling terminal (TE21) represents a mobile radio terminal, that the second communications network (KN2) covers the mobile radio home network of subscriber (A) of the calling terminal (TE21), and that the first communications network (KN1) covers the mobile radio visitor network of said subscriber (A).

10. A service unit (SERV) for establishing a toll-free communication connection between a calling terminal (TE21) which is connected to a first communications network (KN1), and a called terminal, characterized in that the service unit (SERV) is located in a second communications network (KN2), that the service unit (SERV) is equipped with a reception unit (KOM) for receiving an inquiry from the first communications network (KN1) which includes a toll-free universal call number (IFN), wherein the toll-free universal call number is not recognized by the first communications network as a local toll-free number, that the service unit (SERV) is equipped with a control unit (CONTR) for determining a toll-free local call number (LFN) of the first communications network (KN1) from the toll-free universal call number (IFN), and that the service unit (SERV) is equipped with a transmission unit (KOM) for returning the determined toll-free local call number (LFN) to the first communications network (KN1).

11. A service unit as claimed in claim 10, characterized in that the service unit (SERV) is an IN service unit.

12. An exchange (EX2) of a first communications network (KN1) with means to receive a connection request with a toll-free universal call number (IFN) as the called number, wherein the toll-free universal call number is not recognized by the first communications network as a local toll-free number, characterized in that the exchange (EX2) is equipped with means that recognize the connection request as one with a toll-free universal call number (IFN), and in response to said toll-free universal call number (IFN) the exchange (EX2) sends an inquiry to the service unit (SERV) of a second communications network (KN2) which provides this toll-free universal call number (IFN), and that the exchange (EX2) is equipped with means for receiving a toll-free local call number (LFN) returned by the service unit (SERV), and that the exchange (EX2) is equipped with means for controlling the establishment of the requested connection via the first communications network (KN1) in accordance with this received toll-free local call number (LFN).

13. A first communications network (KN1) with means for receiving a connection request with a toll-free universal call number (IFN) as the called number, wherein the toll-free universal call number is not recognized by the first communications network as a local toll-free number, characterized in that the communications network (KN1) is equipped with means that recognize the connection request as one with a toll-free universal call number (IFN), and in response to said toll-free universal call number (IVN) the means sends an inquiry to a service unit (SERV) of a second communications network (KN2) which provides this toll-free universal call number, that the communications network (KN1) is equipped with means for receiving a toll-free local call number (LFN) returned by the service unit (SERV), and that the communications network (KN1) is equipped with means for controlling the establishment of the requested connection via the first communications network (KN1) in accordance with this received toll-free local call number (LFN).

14. A method as claimed in claim 1, characterized in that an identification (NID) of the inquiring communications network is sent to the service unit (SERV), and that the service unit (SERV) determines the toll-free local call number (LFN) from the toll-free universal call number (IFN) as a function of the identification (NID) of the inquiring communications network.

15. A method as claimed in claim 1, characterized in that an identification (SID) of the calling terminal, or of the subscriber (A) assigned to the calling terminal, is sent by the first communications network (KN1) with the inquiry to the service unit (SERV), and that the service unit (SERV) determines the toll-free local call number (LFN) from the toll-free universal call number (IFN) as a function of the identification (SID) of the calling terminal, or the subscriber (A) assigned to the calling terminal.

16. A method as claimed in claim 1, characterized in that the toll-free universal call number (IFN) is recognized in the first communications network (KN1) by means of a profile (SUB_DAT) assigned to the calling terminal or its subscriber (A).

17. A method as claimed in claim 5, characterized in that a linkage of the toll-free universal call number (IFN) with a service provided by the service unit (FREE_SERV) is input into the profile (SUB_DAT).

18. A method as claimed in claim 1, characterized in that the calling terminal (TE21) represents a mobile radio terminal, that the second communications network (KN2) covers the mobile radio home network of subscriber (A) of the calling terminal (TE21), and that the first communications network (KN1) covers the mobile radio visitor network of said subscriber (A).

* * * * *